INVENTORS
Russell E. Peterson
Samuel L. Stewart
BY
Attorney

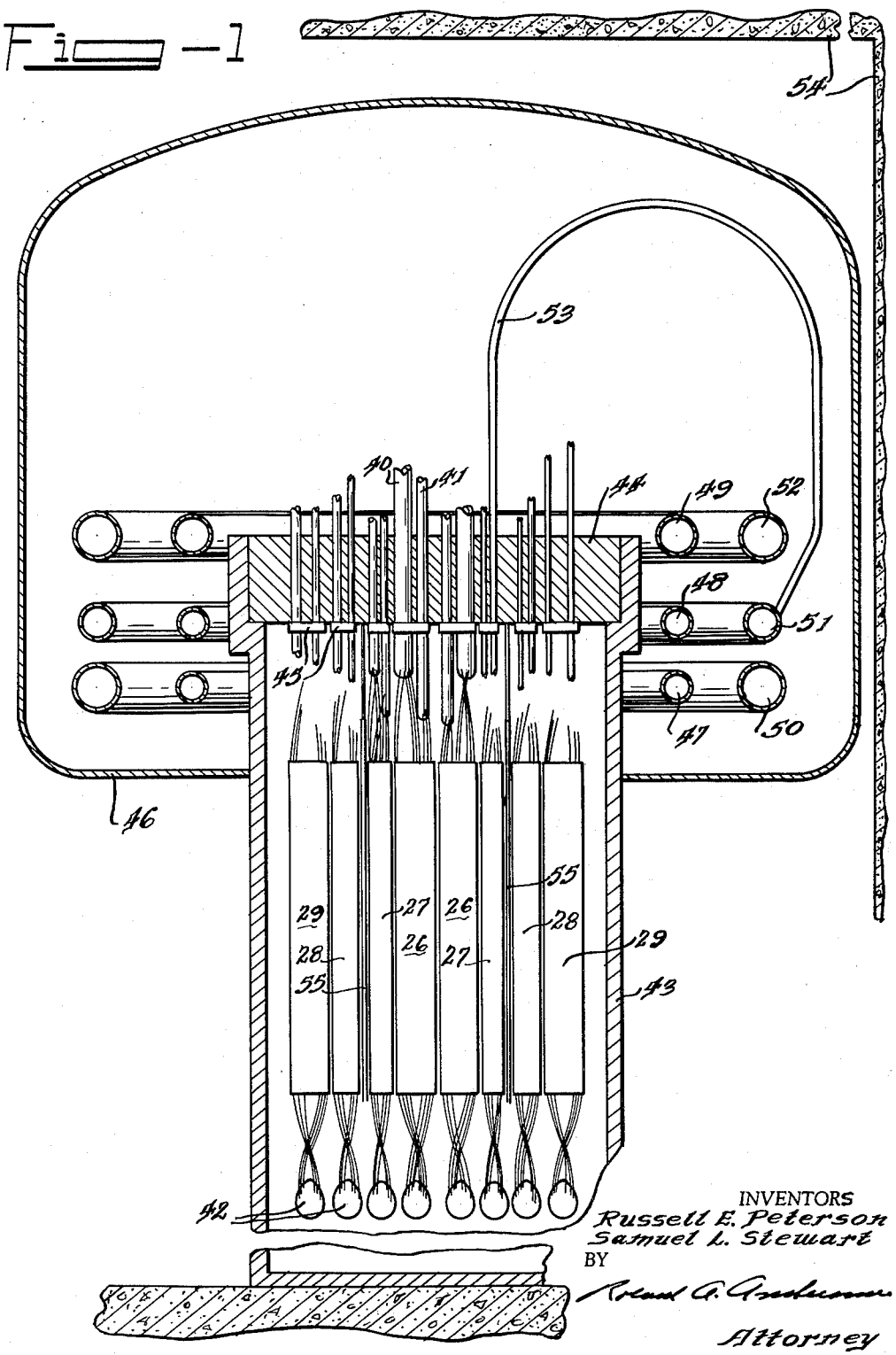

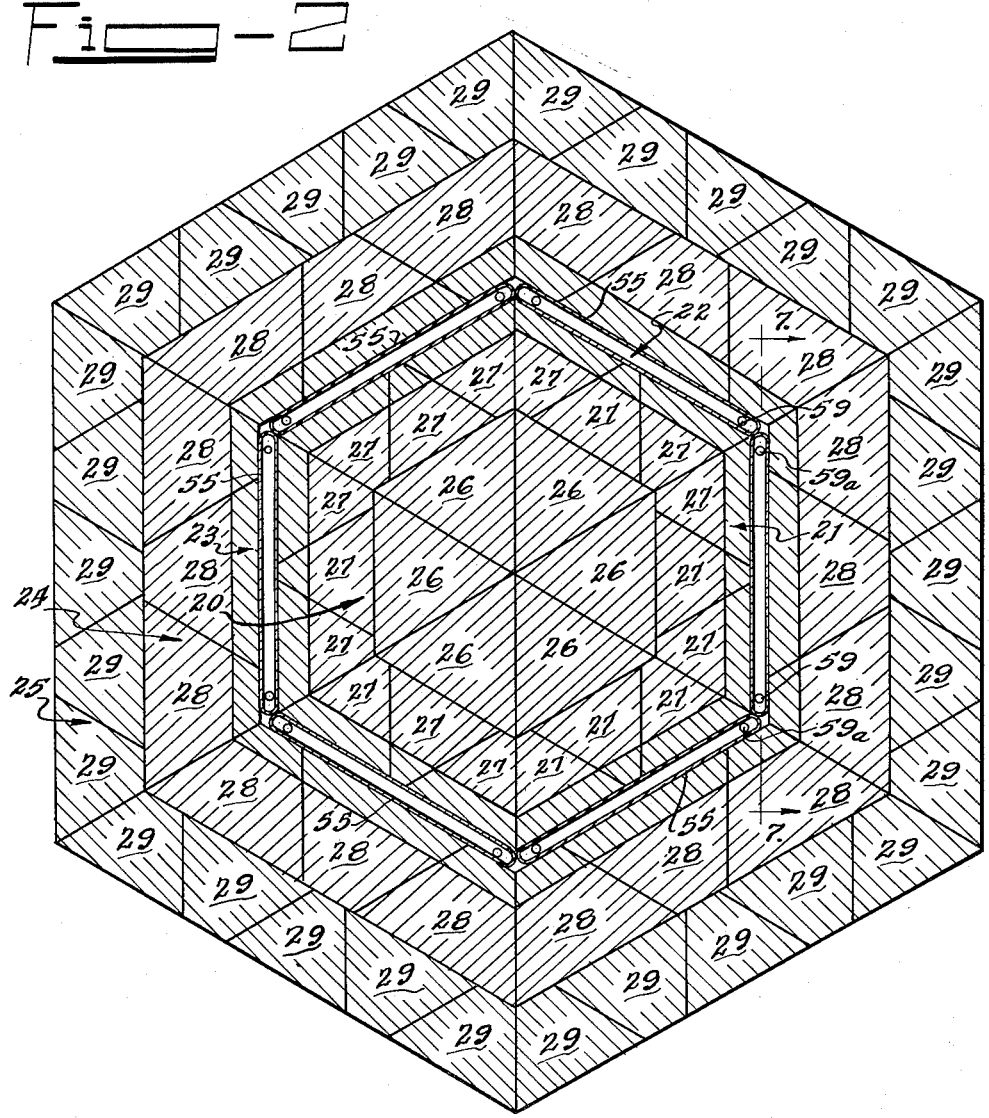

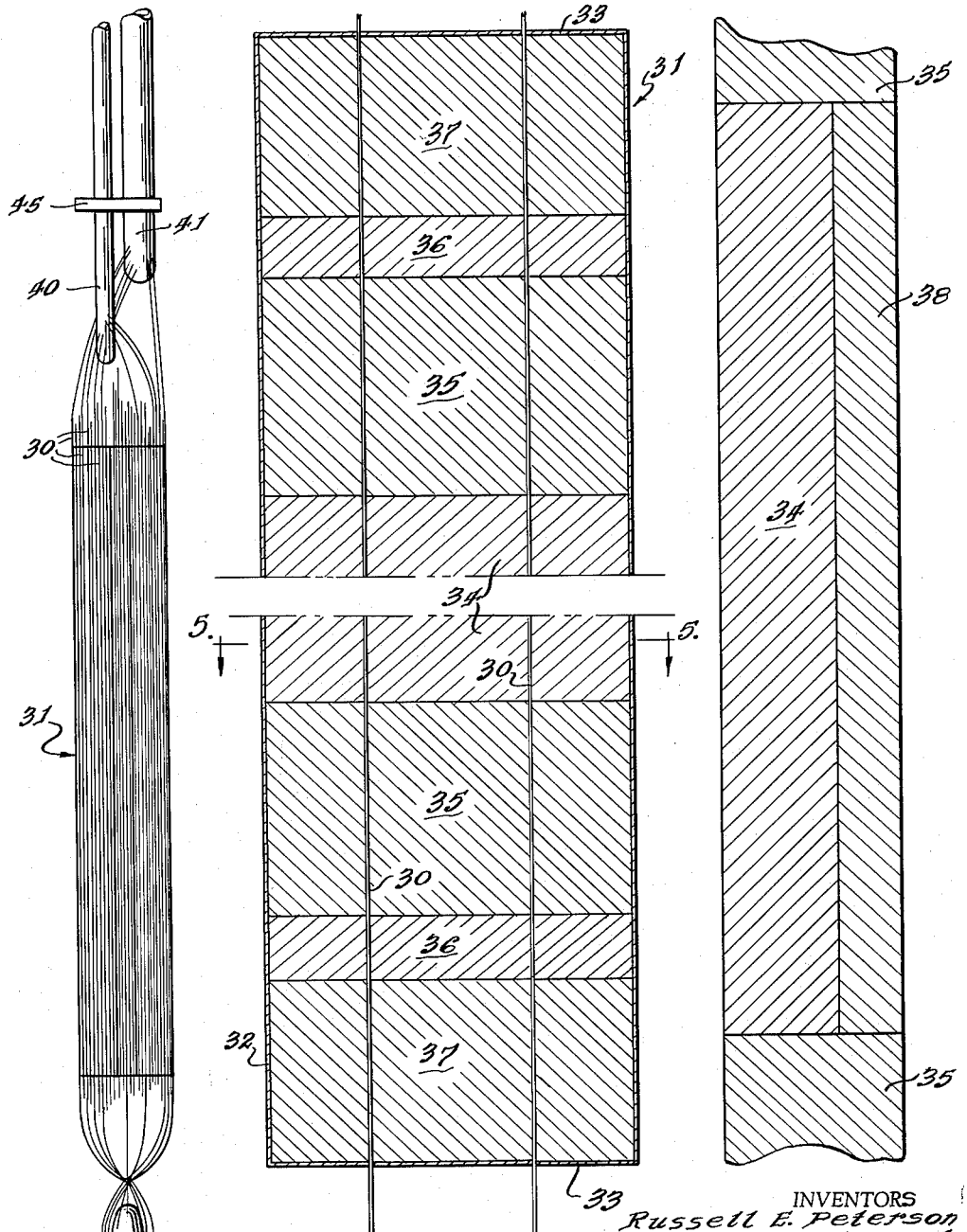

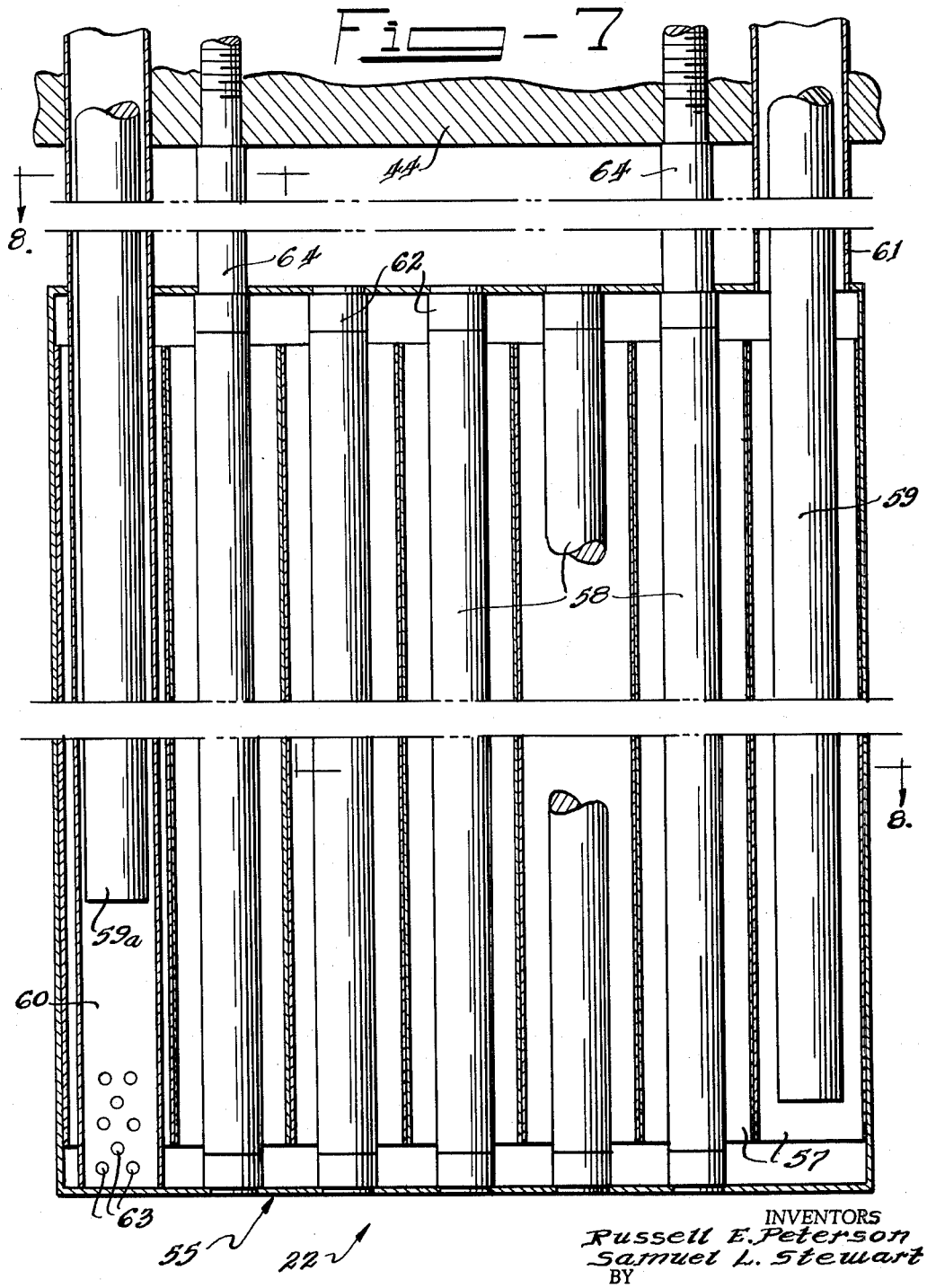

United States Patent Office 3,140,237
Patented July 7, 1964

3,140,237
LARGE FAST NUCLEAR REACTOR
Russell E. Peterson, Kennewick, and Samuel L. Stewart, Richland, Wash., assignors to the United States of America as represented by the United States Atomic Energy Commission
Filed Oct. 16, 1963, Ser. No. 316,783
6 Claims. (Cl. 176—18)

This invention relates to large fast nuclear reactors. In more detail the invention relates to a large direct-cycle, light-water-cooled, supercritical pressure power reactor which operates predominantly on fast neutrons. In still more detail the invention relates to such a reactor which is not hazardous to operate.

Relatively small fast reactors inherently have a negative coolant void coefficient; that is, reactivity decreases with loss of coolant. A hazard which makes the design of large fast reactors difficult is the possibility that such reactors may have a positive coolant void coefficient; that is, reactivity would increase with loss of coolant.

The reason that large fast reactors may have a positive coolant void coefficient whereas small reactors have a negative coolant void coefficient is that the effect observed is the resultant of two contradictory effects. When a fast reactor loses coolant, increased neutron leakage decreases the reactivity of the reactor. Simultaneously, however, hardening of the neutron energy spectrum (increase in average energy of the neutrons present in the core) increases the reactivity. In a small reactor core, there is a net decrease in reactivity because loss of reactivity due to increased neutron leakage predominates. Such a reactor has a negative coolant void coefficient and can be operated without fear that loss of coolant will lead to a harmful nuclear excursion.

As core size increases, neutron leakage becomes relatively of less importance until at some point, dependent on the material composition of the reactor core, the increase in reactivity due to hardening of the neutron spectrum predominates and the reactor core has a positive coolant void coefficient.

One suggestion to avoid such a situation is to increase the volume fraction of coolant within the reactor core to enhance the leakage effect. Such an expedient, however, offers limited compensation and results in a decreased power density and an undesirable degradation in the average neutron energy. Another possible way of reducing the coolant void coefficient, decreasing the length to diameter ratio of the core, is not sufficient to counteract fully the positive coefficient and also strongly increases both fuel and capital costs.

It is desirable to operate nuclearly heated, steam power plants at supercritical temperatures and pressures in order to obtain the highest possible efficiency, and patent application S.N. 232,315, filed October 22, 1962, on behalf of Harold Harty, James J. Regimbal, Kadzuhisa G. Toyoda and Richard D. Widrig discloses a thermal reactor of this type.

It is also known that it is possible to construct a fast reactor using supercritical pressure water as the coolant in order to obtain the increased breeding gain inherent in a fast reactor. In common with other fast reactors, and in fact to a greater extent than in liquid-metal-cooled reactors, large super-critical-pressure, water-cooled reactors tend to have a positive coolant void coefficient, and analysis shows that direct modification of the reactor disclosed in the above-identified application to convert it to a fast reactor would result in a reactor that could not be operated safely because of the strongly positive coolant void coefficient.

It is accordingly an object of the present invention to develop a large power breeder reactor having an acceptable coolant void coefficient.

It is a more specific object of the present invention to develop a large power breeder reactor incorporating Pu-239 as fuel and cooled by light water at supercritical temperature and pressure and having an acceptable coolant void coefficient.

Any fast reactor which has a positive coolant void coefficient can be constructed as taught herein to obtain a negative coolant void coefficient or an acceptably low positive coefficient. The invention is applicable to reactors incorporating U-235 as fuel as well as to reactors incorporating Pu-239 as fuel, although the core size at which it becomes necessary to employ the invention to obtain an acceptable coolant void coefficient is much higher for U-235 than for Pu-239 because of the strong dependence of the capture-to-fission ratio on neutron energy of the Pu-239 isotope. In a reactor incorporating Pu-239 as fuel a slight increase in neutron energy, caused by a loss of coolant, decreases the ratio of neutron captures to neutron fissions, thus increasing reactivity. Thus hardening of the neutron spectrum results in a marked increase in reactivity in a Pu-239 reactor but a much lower increase in reactivity in a U-235 reactor because the decrease in capture-to-fission ratio with an increase in neutron energy is much more pronounced in Pu-239 than in U-235. In addition the invention is applicable to light-metal-cooled fast reactors as well as to low-density water-steam-cooled reactors, although the effect is more pronounced for the low-density water-cooled reactor.

It will be appreciated that this invention is only applicable to very large reactors. However, it is believed that the future of atomic energy resides in large fast reactors because it is only in such reactors that uranium reserves can be fully utilized economically.

The invention will be described specifically in connection with a cylindrical supercritical-pressure fast neutron power reactor incorporating Pu-239 as fuel and developing 300 mw. (e) power. In a reactor of this type and size the danger from a loss-of-coolant accident is very severe since the coolant void coefficient is substantially positive unless measures are taken to avoid such a result. A reactor of this type and size, constructed in accordance with the principles of the present invention, will have an acceptable coolant void coefficient, and, in fact, the specific reactor described herein has a negative coefficient.

To accomplish this result, the reactor core described hereinafter incorporates a plurality of fissionable fast active regions separated by a layer of moderating material at the center of two layers of fertile material. The moderating layer degrades the energy of neutrons leaking out of the fast core regions. Because of their lower energy, a large fraction of these leakage neutrons is absorbed in the fertile material, which has a relatively high intermediate and thermal energy neutron capture cross section, and is thereby prevented from interacting with adjacent fast regions. The increased fast leakage upon coolant loss is sufficiently high to counteract the positive components of the coolant void reactivity coefficient.

Thus, the moderator region, in and of itself, acts to a considerable extent as a barrier to fast neutrons, thereby tending to reduce the fast neutron interaction between fissionable regions. Since fast neutrons are more effective than slow neutrons in producing fissions in the fast fissionable regions, this, in itself, tends to reduce the effective interaction between fissionable regions. Since the fertile regions tend to absorb the neutrons which have become thermalized in the moderator, the combined effect is to form an even more effective barrier to neutron (fast or slow) interaction between fissionable regions. Insofar as the effect on the coolant void reactivity coefficient is concerned, the fertile regions are, in reality, thermal and resonance neutron absorber regions since their purpose is merely to absorb the thermalized neutrons. In theory and in actuality, the fertile material of these regions could be replaced by non-fertile absorber material, e.g., boron. Fertile absorber material is employed solely for purposes of neutron economy.

As a practical matter, it is usually desirable that each fissionable region be independently subcritical, although the invention applies as well to the case where the fissionable regions are individually critical and individually controllable. When the fissionable regions are subcritical, interaction between cores must of course, be sufficient to obtain over-all criticality for the reactor.

The invention will next be described in connection with the accompanying drawings in which:

FIG. 1 is a vertical sectional view of the reactor of the present invention;

FIG. 2 is a schematic view of the reactor;

FIG. 3 is an elevational view of a unit of the reactor;

FIG. 4 is a vertical sectional view of the unit;

FIG. 7 is a vertical sectional view taken on the line 7—7 of FIG. 2 showing a moderator tank; and FIG. 8 is a horizontal sectional view taken on the line 8—8 of FIG. 7.

Figure 5:
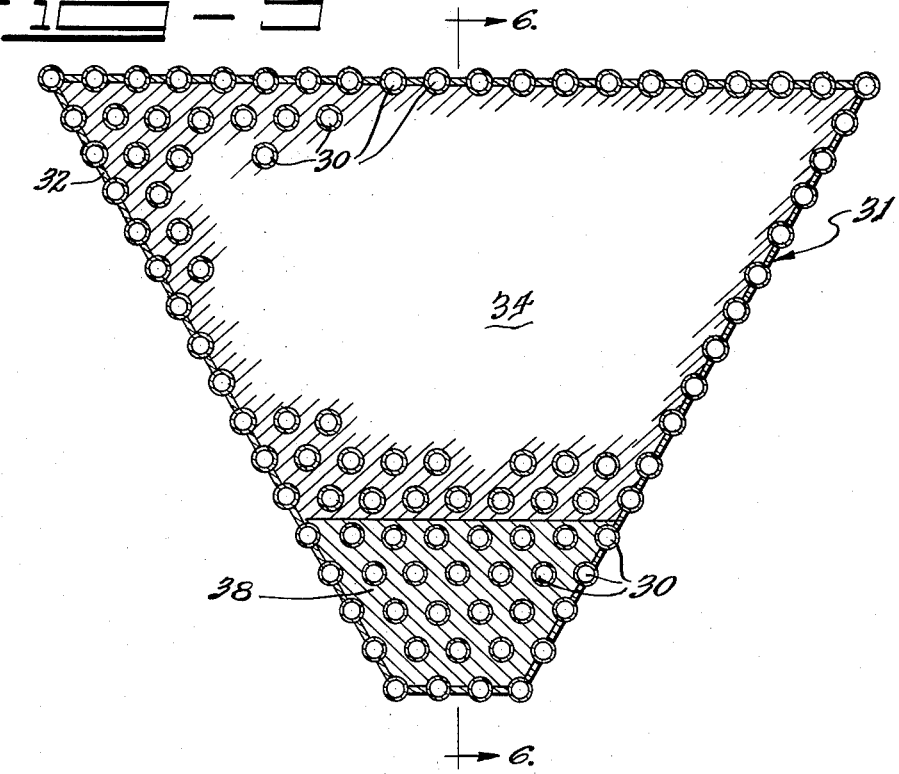
FIG. 5 is a horizontal sectional view taken on the line 5—5 of FIG. 4.

As shown in FIG. 2, a reactor embodying the principles of the present invention comprises a solid central fissionable region 20, a generally annular fertile region 21 surrounding the fissionable region 20, a generally annular moderator region 22 surrounding the fertile region 21, general annular fertile region 23 surrounding the moderator region 22, a generally annular outer fissionable region 24 surrounding the fertile region 23, and a generally annular fertile region 25 surrounding the fissionable region 24.

It will be appreciated that the terms "fertile region" and "fissionable region" are to a certain extent relative terms and that each such region may contain both fertile and fissionable material. However, the fissionable regions will contain substantially more fissionable material than does the fertile region, and vice versa.

The central fissionable region 20, which has the shape of a regular hexagon, comprises six equilateral-triangle prisms 26 of equal size arranged to form a regular-hexagon prism, and portions of 18 prisms 27 of 60°–120°-trapezoidal shape arranged in a ring about the prisms 26. The fertile region 21, which has its interior and exterior in the shape of regular hexagons, comprises the remaining portions of the 18 prisms 27, these portions being directly adjacent the moderator region 22 in spaced relation to the prisms 26. The moderator region 22 comprises masses of flowing cooling water and yttrium hydride or zirconium hydride. The fertile region 23 comprises portions of 18 prisms 28 of 60°–120°-trapezoidal shape arranged in a ring about, and directly adjacent to, the moderator region 22. The annular fissionable region 24 comprises the remaining portions of the prisms 28. The fertile region 25 comprises 30 prisms 29 of 60°–120°-trapezoidal shape arranged on a ring about the prisms 28.

Figure 6:
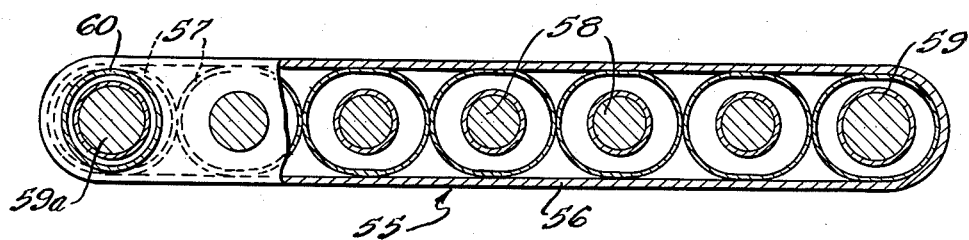
FIG. 6 is a fragmentary vertical section view of the unit taken on the line 6—6 of FIG. 5.

FIGS. 4–6 specifically show the construction of those of prisms 27 and 28 which have their shorter parallel side immediately adjacent the moderator region 22. As shown in FIG. 5, each of the prisms has a plurality of parallel closely spaced tubes 30 extending lengthwise of the prism. Each of these prisms includes a container 31 formed of the outermost tube 30 and a plurality of long narrow strips 32 welded to the tubes and extending therebetween and therealong. The tubes 30 and strips 32 may be formed of "Hastelloy X," a high-temperature nickel-base alloy. As shown n FIG. 4, the container 31 also has end pieces 33 formed of the same material, through which end pieces the tubes 30 extend. FIG. 4 shows only two tubes 30 in order to avoid needless repetition and to clarify the showing of material outside the tubes and within the prisms.

As illustrated in FIG. 4 for each of these prisms, there is provided a fissionable portion 34 extending for most of the length of the prism. Beyond each end of the fissionable portion 34, there are, in succession, a portion 35 of depleted $UO_2$, an insulating portion 36 of $ZrO_2$, and a portion 37 of $Al_2O_3$ fibers, in which gaseous fission products may accumulate. As shown in FIGS. 5 and 6 for each of those prisms 27 and 28 whose tops or shorter of the parallel sides are directly adjacent the moderator region 22, the fissionable portion 34 extends a little over half way across the prism, and beyond the portion 34, there is a fertile portion 38 coextensive with the portion 34.

The construction of the remaining prisms 27 and 28, whose bases or longer sides are directly adjacent the moderator region 23, is exactly the same except that the arrangement of fissionable portion 34 and fertile portion 38 is the reverse of that shown in FIG. 5; that is, the fissionable portion 34 is at the base or longer of the two parallel sides, and the fertile portion 38 is at the top or shorter of the two parallel sides. The fertile portions 38 in the prisms 27 and 28 form the annular fertile regions 21 and 23, shown in FIG. 2.

The construction of prisms 29 is exactly the same as described above for prisms 27 and 28 except that there is no subdivision as shown in FIG. 5, the entire fissionable portion 34 being replaced by depleted $UO_2$ to form a single continuous fertile region 38.

The construction of prisms 26 is exactly the same as described above for prisms 27 and 28 except that the container 30 forms a triangle rather than a trapezoid and except that there is no subdivision as shown in FIG. 5, the entire region within container 30 in FIG. 5 forming a single continuous fissionable region 34.

Light water at a supercritical pressure is passed through the tubes 30 of the prisms 26, 27, 28, and 29. In so doing, the water makes three passes. The first pass is from top to bottom and then from bottom to top through the prisms 29 and 28. The second pass is made similarly through the prisms 27, and the third, through the prisms 26. As shown in FIG. 3, each of the prisms 26, 27, 28, and 29 has an inlet header 40 above, an outlet header 41 above, and a mixing chamber 42 below. The individual paths for water through certain tubes 30 of a given prism extend downward from the inlet header 40 through the prism to the mixing chamber 42, where the paths join. Then, from the mixing chamber 42 new individual paths through the remaining tubes 30 extend upward through the prism to the outlet header 41. The tubes 30 that lie at the outside of the prism and form part of the container 31 of the prism are part of the tubes that carry the water in downward paths from the inlet header 40. These outer tubes 30 serve to cool the container 31 by virtue of forming a part thereof. This arrangement permits maximum utilization of heat derived from the reactor. Use of process feedwater or steam as container coolant avoids the necessity for gaseous cooling of the container which would be wasteful of heat. It will be noted that two-foot sections of the tubes 30 extending between prisms 26, 27, 28, and 29 and mixing chambers 42 are bent to obtain relative thermal expansion relief.

Details of prisms 26, 27, 28 and 29 form no part of the present invention and are the invention of Robert J. Hennig and Duane T. Aase.

As shown in FIG. 1, the prisms 26, 27, 28, and 29 are located in a long vertical vessel 43, which carries at its upper end a support grid 44 for the prisms. Each prism is supported on the bottom of the grid 44 by means of a piece 45 welded to the headers 40 and 41 and attached to the bottom of the grid by bolts or screws (not shown).

Outward of the upper portion of the vessel 43 and within a shell 46, there are six ring headers 47–52, header 47 being an inlet for the first pass, header 48 an outlet for the first pass, header 49 an inlet for the second pass, header 50 an outlet for the second pass, header 51 an inlet for the third pass, and header 52 an outlet for the third pass. The inlet and outlet headers 40 and 41 of each prism are joined to the appropriate inlet ring header 47, 49, or 51, and to the appropriate outlet ring header 48, 50, or 52, respectively, by jumpers that, as shown in FIG. 1 for one jumper 53, extend from the ring headers upwardly, radially outwardly, radially inwardly, and downwardly in large sweeping arcuate loops of about 270° and through the support grid 44.

It is contemplated that the water at supercritical pressure will pass through means (not shown) from the outlet ring header 48 of the first pass to the inlet ring header 49 of the second pass without performing any function, whereas the water, in going from outlet ring header 50 of the second pass to the inlet ring header 51 of the third pass, will, in a manner not shown, serve as a reheater between stages of the turbine being operated by the present reactor.

Each jumper is supported partly by the support grid 44 and partly by the ring header to which it is attached. The ring headers 47–52 are elastically supported by means (not shown) comprising connections with the side of the shell 46 and spring ties with the top of the shell. The shell 46 is supported by the vessel 43 through a sealed connection of the open lower end of the shell to the vessel. The vessel 43 is supported through its base which rests on earth or concrete. The vessel 43 and shell 46 are immersed in water contained in a concrete shield 54. The vessel 43 is rather long in comparison with its diameter; for example, it may have a length of 35' to 40' and a diameter of 9'. It is contemplated that loading and unloading mechanism (not shown) for the reactor may be housed in the vessel 43 below the reactor, so that refuelling may be carried out from below.

The vessel 43 and shell 46 are to be filled with helium. Helium may be bled from the vessel 43 and shell 46 for the removal of fission-product gases, which can escape from the accumulator regions 37 of the prisms 26, 27, 28, 29 through the end pieces 33.

As shown in FIGS. 2, 7, and 8, the moderator region 22 comprises six sections 55 arranged in a regular hexagon. Each section 55 comprises a tank 56, a plurality of tubes 57, a plurality of jacketed rods 58 of yttrium hydride or zirconium hydride, a control rod 59, a safety rod 59a, an inlet tube 60, and an outlet tube 61. The control rod 59 and safety rod 59a are ¾" in O.D., and formed of stainless steel containing 0.5% natural boron. The tank 56 is long, wide, and thin and is made of stainless steel. The tubes 57, also of stainless steel, are somewhat elliptical, provide internal support for the tank 56, and terminate short of the ends thereof. The rods 58 are loosely housed in the tubes 57, through which water flows to cool these rods. The rods 58 terminate short of the ends of the tank 56 but extend the full length of fissionable portions 34 of the prisms and have stainless-steel extensions 62 secured to the ends of the tank 56. The inlet tube 60, which is of stainless steel, extends through the support grid 44 and the top of the tank 56 to the bottom thereof, has outlet perforations 63 adjacent its lower end, and is loosely housed in one of the tubes 57. The outlet tube 61, which is of stainless steel, extends through the support grid 44 and the top of the tank 56. The safety rod 59a is loosely housed in the inlet tube 60 and extends upwardly from the tank 56 through the support grid 44. The control rod 59 is loosely housed in one of the tubes 57 and extends upwardly from the tank 56 through the outlet 61 and the support grid 44. The tank 56 is carried on hangers 64 secured on the support grid 44. The hangers 64 are integrally formed with two of the extensions 62 of the rods 58.

Calculations show that a supercritical pressure power fast reactor of 300 electrical megawatt size constructed as a single fissionable region reactor would not be safe to operate because of the strongly positive coolant void coefficient therein. That is, loss of coolant due to an accident would increase the reactivity of the reactor to an intolerable degree. Such a condition in a reactor cannot be tolerated and no such reactor can ever be built.

The present reactor includes one moderator region dividing the reactor into two fissionable regions. It has been determined that a single such moderator region which is bracketed by fertile regions will reduce the otherwise intolerable positive coolant void coefficient of a 300 mw. reactor to an acceptable level or even to slightly below zero. Thus in the described reactor, loss of coolant has little if any over-all effect on reactivity; if there is an effect, the effect is loss of reactivity.

A larger reactor can also be constructed according to the present invention by employing two or more moderating regions dividing the reactor into three or more fissionable regions. The same principle can be followed in constructing a reactor of any size.

It is also possible to employ an additional moderating region in the blanket to obtain a slight reduction in coolant void coefficient. Such a region has a similar effect to a moderator region separating the fissionable material into regions except that the effect is less pronounced due to its location.

Given the material composition of the reactor core, it is easily possible to calculate the size at which the coolant void coefficient of a single fissionable region reactor becomes positive. For example, for a one region, bare cylindrical reactor of infinite height and having the composition of the fissionable region 20 of the above described reactor a negative void coefficient occurs for radii between 0 and about 20 inches. For larger single region reactors a positive void coefficient exists. By employing the principles of the present invention, it is possible to provide a multiple fissionable region reactor of any desired size, with each of the fissionable regions approaching the size at which it, considered by itself, would have an unacceptable positive coolant void coefficient.

As described the moderating region is 1.1 inches thick and the moderating materials therein are a metal hydride and water. Using those moderating materials, the moderator region should be between about 1 and 3 inches thick to reduce suitably the coolant void coefficient, the thickness actually employed being desirably near the lower end of this range to conserve neutrons. In a high temperature metal cooled reactor utilizing a high temperature but less efficient moderator, such as graphite, a moderator thickness as high as 9 inches might be necessary.

Specific details of the reactor described above will next be given. The distance across flats of the central fissionable region 20 is 33.13 inches, the width of fertile region 21 is 2.62 inches, the width of moderator region 22 is 1.1 inches, the width of fertile region 23 is 2.64 inches, the width of fissionable region 24 is 7.20 inches, and the width of blanket region 25 is 7.53 inches. The six triangular prisms 26 are 13.33 inches on a side; the eighteen trapezoidal prisms 27 have a long side of 10.337 inches and a short side of 1.497 inches; the eighteen trapezoidal prisms 28 have a long side of 15.383 inches and a short side of 4.033 inches; and the 30 trapezoidal prisms 29 of the blanket have a long side of 12.180 inches and a short side of 3.480 inches.

Each of these prisms 26, 27, 28, and 29 is seven feet three inches in length, and the fissionable portion 34 of prisms 26, 27, and 28 is five feet in length. Portions 35 of depleted $UO_2$ are 7.9 inches in length, insulating portions 36 of $ZrO_2$ are two inches in length, and $Al_2O_3$ portions 37 are six inches in length. The fissionable portion 34 of prisms 26 is depleted uranium dioxide enriched with 12½% plutonium dioxide. The fissionable portion 34 of prisms 27 is depleted uranium dioxide enriched with 12½% plutonium dioxide and the fertile portion 38 thereof is depleted uranium dioxide enriched with 3½% plutonium dioxide. Also the fissionable portion 34 of prisms 28 is depleted uranium dioxide enriched with 14½% plutonium dioxide and the fertile portion 38 thereof is depleted uranium dioxide enriched with 3½% plutonium dioxide. Prisms 29 are composed entirely of depleted uranium dioxide except, of course, for the $ZrO_2$ and $Al_2O_3$ portions 36 and 37 at both ends. The enrichment is increased slightly in the annular fissionable region 24 to flatten the power distribution in that region. It may be noted at this time that enrichment of the fertile regions 21 and 23 with 3½% plutonium dioxide, although not necessary to obtain the benefits of the present invention, is desirable from a practical standpoint since it tends to reduce the critical mass and maintain a more constant power distribution in these regions over the life of the reactor.

Furthermore, there are 685 tubes 30 in each of prisms 26 each of which has an outer diameter of .2475 inch and which are spaced .3389 inch apart center to center. There are 490 tubes 30 in each prism 27 each of which has an outer diameter of .225 inch and which are spaced .3080 inch apart center to center. There are 522 tubes 30 in each of prisms 28 each of which has an outer diameter of .2675 inch and which are spaced .4480 inch apart center to center. Finally there are 110 tubes 30 in each of blanket prisms 29 each of which has an outer diameter of .2675 inch and which are spaced apart .925 inch center to center.

Finally, moderator tanks 55 are 1.1 inches thick, 23 inches wide and extend substantially the full length of the prisms.

It should be understood that wherever depleted uranium has been specified for use in the above described reactor, this has been for strictly economic reasons. The more expensive natural uranium could, of course, be substituted for depleted uranium wherever specified, if desired, with an attendant small decrease in specified values of $PuO_2$ enrichment.

The specific reactor described in detail above will operate to produce 300 mw.(e) power. The mean energy level of neutrons producing fission is about 80 kev., which places the reactor in the "fast" classification as normally defined. This reactor has a negative coolant void reactivity coefficient over its entire lifetime.

It is also understood that the invention is not to be limited by the details given herein but that it may be modified within the scope of the appended claims.

The embodiments of the invention in which an exclusive property or privilege is claimed are defined as follows:

1. A large fast nuclear reactor, comprising a plurality of fissionable regions, and a barrier separating each fissionable region from each adjacent fissionable region, said barrier comprising a moderator region and two thermal neutron absorber regions, one absorber region lying between the moderator region and one of the two adjacent fissionable regions, the other lying between the moderator region and the other of the two adjacent fissionable regions.

2. A large fast nuclear reactor, comprising a plurality of fissionable regions, and a barrier separating each fissionable region from each adjacent fissionable region, said barrier comprising a moderator region and two fertile regions, one fertile region lying between the moderator region and one of the two adjacent fissionable regions, the other lying between the moderator region and the other of the two adjacent fissionable regions.

3. A large fast nuclear reactor, comprising a central fissionable region, a first fertile region surrounding the central fissionable region, a moderator region surrounding the first fertile region, a second fertile region surrounding the moderator region, and an outer fissionable region surrounding the second fertile region.

4. A large fast nuclear reactor cooled by water at supercritical temperature and pressure, comprising a central fissionable region containing plutonium-239, an annular fissionable region containing plutonium-239 surrounding said central fissionable region in spaced relation, an annular moderating region lying between the fissionable regions, two annular fertile regions lying between the fissionable regions, one fertile region surrounding the moderator region and directly adjacent thereto, the other being surrounded by the moderator region and directly adjacent thereto, and a blanket region surrounding the annular fissionable region.

5. A reactor according to claim 4 wherein the central fissionable region contains depleted uranium dioxide enriched with 12½% plutonium dioxide, the annular fissionable region contains depleted uranium dioxide enriched with 14½% plutonium dioxide, the fertile regions contain depleted uranium dioxide enriched with 3½% plutonium dioxide, the moderating regions contain about 70% yttrium hydride and about 30% light water, and the blanket regions contain depleted uranium dioxide.

6. A reactor according to claim 5 wherein the central fissionable region is shaped like a regular hexagon and is 33.13 inches across flats, each fertile region is about 2.6 inches wide, the moderating region is 1.1 inches wide, the annular fissionable region is 7.20 inches wide, and the blanket region is 7.53 inches wide.

No references cited.